US009564088B2

(12) United States Patent
Wilcox et al.

(10) Patent No.: US 9,564,088 B2
(45) Date of Patent: Feb. 7, 2017

(54) ELECTRO-OPTIC DISPLAYS WITH REDUCED REMNANT VOLTAGE

(71) Applicant: E INK CORPORATION, Cambridge, MA (US)

(72) Inventors: Russell J. Wilcox, Natick, MA (US); Thomas H. Whitesides, Victoria (CA); Karl R. Amundson, Cambridge, MA (US); Guy M. Danner, Somerville, MA (US); Richard M. Webber, Brookline, MA (US); Charles H. Honeyman, Toronto (CA); Lan Cao, Arlington, MA (US); Richard J. Paolini, Jr., Framingham, MA (US); Rajesh Chebiyam, Nashua, NH (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/687,204

(22) Filed: Apr. 15, 2015

(65) Prior Publication Data

US 2015/0221257 A1    Aug. 6, 2015

Related U.S. Application Data

(60) Division of application No. 14/022,534, filed on Sep. 10, 2013, now abandoned, which is a division of
(Continued)

(51) Int. Cl.
*G02B 26/00* (2006.01)
*G09G 3/34* (2006.01)
(Continued)

(52) U.S. Cl.
CPC .............. *G09G 3/344* (2013.01); *G02B 26/00* (2013.01); *G02B 26/026* (2013.01);
(Continued)

(58) Field of Classification Search
CPC ....... G02B 26/00; G02B 26/02; G02B 26/026; G02B 26/06; G09G 3/34; G09G 3/344; G09G 3/3629; G09G 2320/0257; G09G 2340/16; G02F 1/167; G02F 2001/1678; B01J 13/10
(Continued)

(56) References Cited

U.S. PATENT DOCUMENTS 3,668,106 A    6/1972   Ota
3,756,693 A    9/1973   Ota
(Continued)

FOREIGN PATENT DOCUMENTS

DE    2523763        2/1975
EP    WO9967678 A2   10/2001
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Loha Ben
(74) *Attorney, Agent, or Firm* — David J. Cole

(57) ABSTRACT

The invention provides materials and methods (including driving methods) for reducing the effects of remnant voltages in electro-optic displays.

8 Claims, 2 Drawing Sheets

Related U.S. Application Data application No. 10/904,707, filed on Nov. 24, 2004, now Pat. No. 8,558,783, which is a continuation-in-part of application No. 10/879,335, filed on Jun. 29, 2004, now Pat. No. 7,528,822, which is a continuation-in-part of application No. 10/814,205, filed on Mar. 31, 2004, now Pat. No. 7,119,772, which is a continuation-in-part of application No. 10/065,795, filed on Nov. 20, 2002, now Pat. No. 7,012,600.

(60) Provisional application No. 60/481,040, filed on Jun. 30, 2003, provisional application No. 60/481,053, filed on Jul. 2, 2003, provisional application No. 60/481,405, filed on Sep. 22, 2003, provisional application No. 60/320,070, filed on Mar. 31, 2003, provisional application No. 60/320,207, filed on May 5, 2003, provisional application No. 60/481,669, filed on Nov. 19, 2003, provisional application No. 60/481,675, filed on Nov. 20, 2003, provisional application No. 60/557,094, filed on Mar. 26, 2004, provisional application No. 60/319,007, filed on Nov. 20, 2001, provisional application No. 60/319,010, filed on Nov. 21, 2001, provisional application No. 60/319,034, filed on Dec. 18, 2001, provisional application No. 60/319,037, filed on Dec. 20, 2001, provisional application No. 60/319,040, filed on Dec. 21, 2001, provisional application No. 60/481,711, filed on Nov. 26, 2003, provisional application No. 60/481,713, filed on Nov. 26, 2003.

(51) Int. Cl.
- G02B 26/02 (2006.01)
- G02F 1/167 (2006.01)
- G02F 1/133 (2006.01)
- G09G 3/36 (2006.01)

(52) U.S. Cl.
CPC .......... *G02F 1/13306* (2013.01); *G02F 1/167* (2013.01); *G09G 3/34* (2013.01); *G02F 2001/1678* (2013.01); *G09G 3/3629* (2013.01); *G09G 2320/0257* (2013.01); *G09G 2340/16* (2013.01)

(58) Field of Classification Search
USPC ... 359/228, 245, 253, 296; 345/60, 107, 205
See application file for complete search history.

(56) References Cited

U.S. PATENT DOCUMENTS

| | | |
|---|---|---|
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 3,972,040 A | 7/1976 | Hilsum et al. |
| 4,041,481 A | 8/1977 | Sato |
| 4,088,395 A | 5/1978 | Gigila |
| 4,418,346 A | 11/1983 | Batchelder |
| 4,430,648 A | 2/1984 | Togashi et al. |
| 4,450,440 A | 5/1984 | White |
| 4,741,604 A | 5/1988 | Kornfeld |
| 4,746,917 A | 5/1988 | Di Santo et al. |
| 4,833,464 A | 5/1989 | Di Santo et al. |
| 4,947,157 A | 8/1990 | Di Santo et al. |
| 4,947,159 A | 8/1990 | Di Santo et al. |
| 5,066,946 A | 11/1991 | Disanto et al. |
| 5,223,115 A | 6/1993 | DiSanto et al. |
| 5,247,290 A | 9/1993 | Di Santo et al. |
| 5,254,981 A | 10/1993 | Disanto et al. |
| 5,266,937 A | 11/1993 | DiSanto et al. |
| 5,293,528 A | 3/1994 | DiSanto et al. |
| 5,302,235 A | 4/1994 | DiSanto et al. |
| 5,412,398 A | 5/1995 | DiSanto et al. |
| 5,467,107 A | 11/1995 | DiSanto et al. |
| 5,467,217 A | 11/1995 | Check, III et al. |
| 5,499,038 A | 3/1996 | DiSanto et al. |
| 5,654,732 A | 8/1997 | Katakura |
| 5,684,501 A | 11/1997 | Knapp et al. |
| 5,689,282 A | 11/1997 | Wolfs et al. |
| 5,717,515 A | 2/1998 | Sheridon |
| 5,739,801 A | 4/1998 | Sheridon |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,866,284 A | 2/1999 | Vincent |
| 5,872,552 A | 2/1999 | Gordon, II et al. |
| 5,892,504 A | 4/1999 | Knapp |
| 5,896,117 A | 4/1999 | Moon |
| 5,930,026 A | 7/1999 | Jacobson et al. |
| 5,933,203 A | 8/1999 | Wu et al. |
| 5,961,804 A | 10/1999 | Jacobson et al. |
| 5,963,456 A | 10/1999 | Klein et al. |
| 5,978,052 A | 11/1999 | Ilcisin et al. |
| 6,002,384 A | 12/1999 | Tamai et al. |
| 6,017,584 A | 1/2000 | Albert et al. |
| 6,034,807 A | 3/2000 | Little et al. |
| 6,054,071 A | 4/2000 | Mikkelsen, Jr. |
| 6,055,091 A | 4/2000 | Sheridon et al. |
| 6,057,180 A | 4/2000 | Gudesen et al. |
| 6,057,814 A | 5/2000 | Kalt |
| 6,064,410 A | 5/2000 | Wen et al. |
| 6,067,185 A | 5/2000 | Albert et al. |
| 6,081,285 A | 6/2000 | Wen et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,154,190 A | 11/2000 | Yang et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,211,998 B1 | 4/2001 | Sheridon |
| 6,225,971 B1 | 5/2001 | Gordon, II et al. |
| 6,232,950 B1 | 5/2001 | Albert et al. |
| 6,236,385 B1 | 5/2001 | Nomura et al. |
| 6,239,896 B1 | 5/2001 | Ikeda |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,320,565 B1 | 11/2001 | Albu et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,348,908 B1 | 2/2002 | Richley et al. |
| 6,359,605 B1 | 3/2002 | Knapp et al. |
| 6,373,461 B1 | 4/2002 | Hasegawa et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,407,763 B1 | 6/2002 | Yamaguchi et al. |
| 6,413,790 B1 | 7/2002 | Duthaler et al. |
| 6,421,033 B1 | 7/2002 | Williams et al. |
| 6,422,687 B1 | 7/2002 | Jacobson |

(56) References Cited

U.S. PATENT DOCUMENTS

| | | |
|---|---|---|
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,462,837 B1 | 10/2002 | Tone |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,612 B2 | 12/2003 | Machida et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Morrison et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,844 B2 | 6/2004 | Machida et al. |
| 6,753,999 B2 | 6/2004 | Zehner et al. |
| 6,762,744 B2 | 7/2004 | Katase |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Pratt et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,956,557 B2 | 10/2005 | Machida et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,071,913 B2 | 7/2006 | Albert et al. |
| 7,110,163 B2 | 9/2006 | Webber et al. |
| 7,116,318 B2 | 10/2006 | Amundson et al. |
| 7,119,772 B2 | 10/2006 | Amundson et al. |
| 7,170,670 B2 | 1/2007 | Webber |
| 7,176,880 B2 | 2/2007 | Amundson et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 * | 4/2007 | Zhang ................ B01J 13/10 345/107 |
| 7,223,672 B2 | 5/2007 | Kazlas et al. |
| 7,230,604 B2 | 6/2007 | Machida et al. |
| 7,230,750 B2 | 6/2007 | Whitesides et al. |
| 7,236,291 B2 | 6/2007 | Kaga et al. |
| 7,256,766 B2 | 8/2007 | Albert et al. |
| 7,259,744 B2 | 8/2007 | Arango et al. |
| 7,280,094 B2 | 10/2007 | Albert |
| 7,312,916 B2 | 12/2007 | Pullen et al. |
| 7,321,459 B2 | 1/2008 | Masuda et al. |
| 7,339,715 B2 | 3/2008 | Webber et al. |
| 7,365,394 B2 | 4/2008 | Denis et al. |
| 7,365,733 B2 | 4/2008 | Duthaler et al. |
| 7,369,299 B2 | 5/2008 | Sakurai et al. |
| 7,388,572 B2 * | 6/2008 | Duthaler ............ G02B 26/026 345/107 |
| 7,525,719 B2 | 4/2009 | Yakushiji et al. |
| 7,528,822 B2 | 5/2009 | Amundson et al. |
| 7,561,324 B2 | 7/2009 | Duthaler et al. |
| 7,602,374 B2 | 10/2009 | Zehner et al. |
| 7,667,684 B2 | 2/2010 | Jacobson et al. |
| 7,728,811 B2 | 6/2010 | Albert et al. |
| 7,893,435 B2 | 2/2011 | Kazlas et al. |
| 8,129,655 B2 | 3/2012 | Jacobson et al. |
| 8,558,783 B2 | 10/2013 | Wilcox et al. |
| 8,928,562 B2 | 1/2015 | Gates et al. |
| 2001/0026260 A1 | 10/2001 | Yoneda et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0196219 A1 | 12/2002 | Matsunaga et al. |
| 2003/0058223 A1 | 3/2003 | Tracy et al. |
| 2003/0102858 A1 | 6/2003 | Jacobson et al. |
| 2004/0051934 A1 | 3/2004 | Machida et al. |
| 2004/0105036 A1 | 6/2004 | Danner et al. |
| 2004/0119681 A1 | 6/2004 | Albert et al. |
| 2004/0120024 A1 | 6/2004 | Chen et al. |
| 2004/0190115 A1 | 9/2004 | Liang et al. |
| 2004/0246562 A1 | 12/2004 | Chung et al. |
| 2005/0012980 A1 | 1/2005 | Wilcox et al. |
| 2005/0018273 A1 | 1/2005 | Honeyman et al. |
| 2005/0259068 A1 | 11/2005 | Nihei et al. |
| 2005/0285500 A1 | 12/2005 | Hattori et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2008/0062159 A1 * | 3/2008 | Roh ................ G02F 1/167 345/205 |
| 2008/0291184 A1 | 11/2008 | Zhou et al. |

FOREIGN PATENT DOCUMENTS

| | | |
|---|---|---|
| EP | 462847 | 9/2004 |
| EP | 1500971 A1 | 1/2005 |
| JP | 03091722 | 4/1991 |
| JP | 03096925 A | 4/1991 |
| JP | 05173194 A | 7/1993 |
| JP | 06233131 A | 8/1994 |
| JP | 09016116 A | 1/1997 |
| JP | 09185087 A | 7/1997 |
| JP | 09230391 A | 9/1997 |
| JP | 11113019 A | 4/1999 |
| JP | 2000221546 | 8/2000 |
| WO | WO9910870 | 3/1999 |
| WO | WO0005704 | 2/2000 |
| WO | WO0036560 | 6/2000 |
| WO | WO0038000 | 6/2000 |
| WO | WO0067110 | 11/2000 |

(56) References Cited

FOREIGN PATENT DOCUMENTS

| WO | WO0107961 | 2/2001 |
|----|-----------|--------|
| WO | WO0127690 | 4/2001 |
| WO | WO2004079442 | 9/2004 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater, 14(11), 845 (2002) Mar. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Dec. 31, 2001.

Yamaguchi, Y., et al., "Toner display using insulative particles charged triboelectrically", Asia Display/IDW '01, p. 1729, Paper AMD4-4 (2001) Dec. 31, 2001.

International Search Report and Written Opinion for PCT/US2003/107315.

Antia, M., "Switchable Reflections Make Electronic Ink", Science, 285, 658 (1999) Dec. 31, 1999.

Chen, Y., et al., "A Conformable Electronic Ink Display using a Foil-Based a-Si TFT Array", SID 01 Digest, 157 (Jun. 2001) Jun. 30, 2001.

Comiskey, B., et al., "An electrophoretic ink for all-printed reflective electronic displays", Nature, 394, 253 (1998) Dec. 31, 1998.

Comiskey, B., et al., "Electrophoretic Ink: A Printable Display Material", SID 97 Digest (1997), p. 75 Dec. 31, 1997.

Drzaic, P., et al., "A Printed and Rollable Bistable Electronic Display", SID 98 Digest (1998), p. 1131 Dec. 31, 1998.

Duthaler, G., et al., "Active-Matrix Color Displays Using Electrophoretic Ink and Color Filters", SID 02 Digest, 1374 :2002) Dec. 31, 2002.

Hunt, R.W.G., "Measuring Color", 3d. Edn, Fountain Press (ISBN 0 86343 387 1), p. 63 (1998) Dec. 31, 1998.

Jacobson, J., et al., "The last book", IBM Systems J., 36, 457 (1997) Dec. 31, 1997.

Jo, G-R, et al., "Toner Display Based on Particle Movements", Chem. Mater, 14, 664 (2002) Dec. 31, 2002.

Kazlas, P., et al., "12.1" SVGA Microencapsulated Electrophoretic Active Matrix Display for Information Applicances", SID 01 Digest, 152 (Jun. 2001) Jun. 30, 2001.

Mossman, M.A., et al., "A New Reflective Color Display Technique Based on Total Internal Reflection and Substractive color Filtering", SID 01 Digest, 1054 (2001) Dec. 31, 2001.

Pitt, M.G., et al., "Power Consumption of Microencapsulated Electrophoretic Displays for Smart Handheld Applications", SID 02 Digest, 1378 (2002) Dec. 31, 2002.

Poor, A., "Feed forward makes LCDs Faster", available at "http://www.extremetech.com/article2/0,3973,10085,00.asp" Sep. 24, 2001.

Shiffman, R.R., et al., "An Electrophoretic Image Display with Internal NMOS Address Logic and Display Drivers," Proceedings of the SID, 1984, vol. 25, 105 (1984) Dec. 31, 1984.

Singer, B., et al., "An X-Y Addressable Electrophoretic Display," Proceedings of the SID, 18, 255 (1977) Dec. 31, 1977.

Webber, R., "Image Stability in Active-Matrix Microencapsulated Electrophoretic Displays", SID 02 Digest, 126 (2002) Dec. 31, 2002.

Amundson, K., et al., "12.3: Flexible, Active-Matrix Display Constructed Using a Microencapsulated Electrophoretic Material and an Organic-Semiconductor-Based Backplane", SID 01 Digest, 160 (Jun. 2001) Jun. 30, 2001.

* cited by examiner

ELECTRO-OPTIC DISPLAYS WITH REDUCED REMNANT VOLTAGE

REFERENCE TO RELATED APPLICATIONS

This application is a division of copending application Ser. No. 14/022,534, filed Sep. 10, 2013 (Publication No. 2014/0009817, now abandoned), which is itself a division of application Ser. No. 10/904,707 filed Nov. 24, 2004 (Publication No. 2005/0179642, now U.S. Pat. No. 8,558,783, issued Oct. 15, 2013), which itself is a continuation-in-part of application Ser. No. 10/879,335, filed Jun. 29, 2004 (Publication No. 2005/0024353, now U.S. Pat. No. 7,528, 822, issued May 5, 2009), which itself is a continuation-in-part of application Ser. No. 10/814,205, filed Mar. 31, 2004 (Publication No. 2005/0001812, now U.S. Pat. No. 7,119, 772, issued Oct. 10, 2006), which itself is a continuation-in-part of application Ser. No. 10/065,795, filed Nov. 20, 2002 (Publication No. 2003/0137521, now U.S. Pat. No. 7,012,600, issued Mar. 14, 2006). The aforementioned application Ser. No. 10/879,335 claims benefit of Application Ser. No. 60/481,040, filed Jun. 30, 2003, of Application Ser. No. 60/481,053, filed Jul. 2, 2003, and of Application Ser. No. 60/481,405, filed Sep. 22, 2003. The aforementioned application Ser. No. 10/814,205 claims benefit of Application Ser. No. 60/320,070, filed Mar. 31, 2003, of Application Ser. No. 60/320,207, filed May 5, 2003, of Application Ser. No. 60/481,669, filed Nov. 19, 2003, of Application Ser. No. 60/481,675, filed Nov. 20, 2003 and of Application Ser. No. 60/557,094, filed Mar. 26, 2004. The aforementioned application Ser. No. 10/065,795 claims benefit of Application Ser. No. 60/319,007, filed Nov. 20, 2001, of Application Ser. No. 60/319,010, filed Nov. 21, 2001, of Application Ser. No. 60/319,034, filed Dec. 18, 2001, of Application Ser. No. 60/319,037, filed Dec. 20, 2001, and of Application Ser. No. 60/319,040, filed Dec. 21, 2001.

The aforementioned application Ser. No. 10/904,707 also claims benefit of Application Ser. No. 60/481,711, filed Nov. 26, 2003, and of Application Ser. No. 60/481,713, filed Nov. 26, 2003.

This application is related to application Ser. No. 10/249, 973, filed May 23, 2003 (now U.S. Pat. No. 7,193,625), which is a continuation-in-part of the aforementioned application Ser. No. 10/065,795. Application Ser. No. 10/249,973 also claims benefit of Application Ser. No. 60/319,315, filed Jun. 13, 2002 and of Application Ser. No. 60/319,321, filed Jun. 18, 2002. This application is also related to copending application Ser. No. 10/063,236, filed Apr. 2, 2002 (Publication No. 2002/0180687, now U.S. Pat. No. 7,170,670).

The entire contents of the aforementioned applications are herein incorporated by reference. The entire contents of all United States Patents and published and copending Applications mentioned below are also herein incorporated by reference.

BACKGROUND OF INVENTION

This invention relates to electro-optic displays with reduced remnant voltage, and to methods for reducing remnant voltage in electro-optic displays. The term "remnant voltage" is used herein to refer to a persistent or decaying electric field that remains in certain electro-optic displays after an addressing pulse (a voltage pulse used to change the optical state of the electro-optic medium) is terminated. It has been found that such remnant voltages can lead to undesirable effects on the images displayed on electro-optic displays; in particular, remnant voltages can lead to so-called "ghosting" phenomena, in which, after the display has been rewritten, traces of the previous image are still visible. The present invention is especially, though not exclusively, intended for use in electrophoretic displays.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning in the imaging art of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783;

5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; 1,482,354; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; 6,545,291; 6,580,545; 6,639,578; 6,652, 075; 6,657,772; 6,664,944; 6,680,725; 6,683,333; 6,704, 133; 6,710,540; 6,721,083; 6,727,881; 6,738,050; 6,750, 473; 6,753,999; 6,816,147; 6,819,471; and 6,822,782; and U.S. Patent Applications Publication Nos. 2002/0019081; 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0053189; 2003/0102858; 2003/0132908; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; and 2004/0119681; and International Applications Publication Nos. WO 99/67678; WO 00/05704; WO 00/38000; WO 00/38001; WO00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; and WO 2004/090857.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (now U.S. Pat. No. 7,420,549), that such electro-wetting displays can be made bistable.

Other types of electro-optic materials may also be used in the present invention. Of particular interest, bistable ferroelectric liquid crystal displays (FLC's) are known in the art and have exhibited remnant voltage behavior.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals.

In contrast, bistable electro-optic displays act, to a first approximation, as impulse transducers, so that the final state of a pixel depends not only upon the electric field applied and the time for which this field is applied, but also upon the state of the pixel prior to the application of the electric field.

Also, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

The aforementioned 2003/0137521 describes how a direct current (DC) imbalanced waveform can result in a remnant voltage being created, this remnant voltage being ascertainable by measuring the open-circuit electrochemical potential of a display pixel.

For reasons explained at length in the aforementioned copending applications, when driving an electro-optic display it is desirable to use a drive scheme that is DC balanced, i.e., on which has the property that, for any sequence of optical states, the integral of the applied voltage is zero whenever the final optical state matches the initial optical state. This guarantees that the net DC imbalance experienced by the electro-optic layer is bounded by a known value. For example, a 15 V, 300 ms pulse may be used to drive an electro-optic layer from the white to the black state. After this transition, the imaging layer has experienced 4.5 V-s of DC-imbalanced impulse. To drive the film back to white, if a −15 V, 300 ms pulse is used, then the imaging layer is DC balanced across the series of transitions from white to black and back to white.

It has now been found that remnant voltage is a more general phenomenon in electrophoretic and other impulse-driven electro-optic displays, both in causes and effects. It has also been found that DC imbalances cause long-term lifetime degradation of electrophoretic displays.

Remnant voltage has been measured in electrophoretic displays by starting with a sample that has not been switched for a long period of time (e.g. hours or days). A voltmeter is applied across the open pixel circuit and a "Base Voltage" reading is measured. An electric field is then applied to the pixel, for example a switching waveform. Immediately after the waveform ends, the voltmeter is used to measure the open-circuit potential over a series of periods, and the difference between the measured reading and the original Base Voltage is regarded as the "remnant voltage".

The remnant voltage decays in a complex manner which may be loosely approximated mathematically as a sum of exponentials. In typical experiments, 15 V was applied across the electro-optic medium for approximately 1 second. Immediately after the end of this voltage pulse, a remnant voltage of between +3 V and −3 V was measured; 1 second later a remnant voltage of between +1 V and −1 V was measured; ten minutes later the remnant voltage was near zero (relative to the original Base Voltage).

The term "remnant voltage" is sometimes used herein as a term of convenience referring to an overall phenomenon. However the basis for the switching behavior of impulse-driven electro-optic displays is the application of a voltage impulse (the integral of voltage with respect to time) across the electro-optic medium. As shown in FIG. 1 of the accompanying drawings, which is a typical graph of remnant voltage against time, remnant voltage reaches a peak value, designated 102, immediately after the application of a driving pulse (the time scale in FIG. 1 is essentially arbitrary), and thereafter decays substantially exponentially, as indicated by curve 104 in FIG. 1. The persistence of the remnant voltage for a significant time period applies a "remnant impulse" represented by the area 106 under curve 104, to the electro-optic medium, and strictly speaking it is this remnant impulse, rather than the remnant voltage, that is responsible for the effects on the optical states of electro-optic displays normally considered as caused by remnant voltage.

In theory the effect of remnant voltage should correspond directly to remnant impulse. In practice, however, the impulse switching model can lose accuracy at low voltages. Some electro-optic media, including preferred electrophoretic media used in experiments described herein, have a small threshold, such that a remnant voltage of about 1 V does not cause a noticeable change in the optical state of the medium after a drive pulse ends. Thus, two equivalent remnant impulses may differ in actual consequences, and it may be helpful to increase the threshold of the electro-optic medium to reduce the effect of remnant voltage. E Ink has produced electrophoretic media having a "small threshold" adequate to prevent remnant voltage experienced in typical use from immediately changing the display image after a drive pulse ends. If the threshold is inadequate or if the remnant voltage is too high, the display may present a kickback/self-erasing or self-improving phenomenon.

Even when remnant voltages are below a small threshold, they do have a serious effect on image switching if they still persist when the next image update occurs. For example, suppose that during an image update of an electrophoretic display a +/−15 V drive voltage is applied to move the electrophoretic particles. If a +1 V remnant voltage persists from a prior update, the drive voltage would effectively be shifted from +15 V/−15 V to +16 V/−14 V. As a result, the pixel would be biased toward the dark or white state, depending on whether it has a positive or negative remnant voltage. Furthermore, this effect varies with elapsed time due to the decay rate of the remnant voltage. The electro-optic material in a pixel switched to white using a 15 V, 300 ms drive pulse immediately after a previous image update may actually experience a waveform closer to 16 V for 300 ms, whereas the material in a pixel switched to white one minute later using the exact same drive pulse (15 V, 300 ms) may actually experience a waveform closer to 15.2 V for 300 ms. Consequently the pixels may show noticeably different shades of white.

If the remnant voltage field has been created across multiple pixels by a prior image (say a dark line on a white background) then the remnant voltages may also be arrayed across the display in a similar pattern. In practical terms then, the most noticeably effect of remnant voltage on display performance is ghosting. This problem is in addition to the problem previously noted, namely that DC imbalance (e.g. 16 V/14 V instead of 15 V/15 V) may be a cause of slow lifetime degradation of the electro-optic medium.

Ghosting or similar visual artifacts may be measured optically by a photometer. In handheld device display screens, two neighboring pixels with the same target brightness should differ in actual brightness by less than 2L* (where L* has the usual ICE definition:

$$L^* = 116(R/R_0)^{1/3} - 16$$

where R is the reflectance and R0 is a standard reflectance value), preferably less than 1L*, and ideally less than 0.3L* to avoid user objection.

If a remnant voltage decays slowly and is nearly constant, then its effect in shifting the waveform does not vary from image update to update and may actually create less ghosting than a remnant voltage that decays quickly. Thus the ghosting experienced by updating one pixel after 10 minutes and another pixel after 11 minutes is much less than the ghosting experienced by updating one pixel immediately and another pixel after 1 minute. Conversely, a remnant voltage that decays so quickly that it approaches zero before the next update occurs may in practice cause no detectable ghosting. Accordingly, for practical purposes, remnant voltages that are greater than about 0.2 V for a duration of between 10 ms and one hour, and most specifically between 50 ms and 10 minutes, give rise to most concern.

As will be evident from the discussion above, the effects of remnant voltage are reduced by minimizing the remnant impulse. As shown in FIG. 1, this can be accomplished by reducing the peak remnant voltage or by increasing the decay rate. In theory, it might be predicted that if it were possible to measure remnant voltage instantaneously and perfectly after the completion of a drive pulse, the peak remnant voltage would be nearly equal in magnitude but opposite in sign to the voltage of the drive pulse. In practice, a good deal of the remnant voltage appears to decay so quickly (e.g. less than 20 ms) that the "peak" remnant voltage measured experimentally is much smaller. Thus, the "peak" remnant voltage may be reduced in practice by either (1) operating the display at a lower voltage or (2) increasing the very fast decay that occurs within the initial milliseconds after an image update and which results in very low remnant impulse. In essence, other than operating at a lower voltage, one main way to reduce remnant impulse is to increase decay rates.

There are multiple potential sources of remnant voltage. It is believed (although this invention is in no way limited by this belief), that a primary cause of remnant voltage is ionic polarization within the materials of the various layers forming the display.

Such polarization occur in various ways. In a first (for convenience, denoted "Type I") polarization, an ionic double layer is created across or adjacent a material interface. For example, a positive potential at an indium-tin-oxide ("ITO") electrode may produce a corresponding polarized layer of negative ions in an adjacent laminating adhesive. The decay rate of such a polarization layer is associated with the recombination of separated ions in the lamination adhesive layer. The geometry of such a polarization layer is determined by the shape of the interface, but is typically planar in nature.

In a second ("Type II") type of polarization, nodules, crystals or other kinds of material heterogeneity within a single material can result in regions in which ions can move or less quickly than the surrounding material. The differing rate of ionic migration can result in differing degrees of charge polarization within the bulk of the medium, and polarization may thus occur within a single display component. Such a polarization may be substantially localized in nature or dispersed throughout the layer.

In a third ("Type III") type of polarization, polarization may occur at any interface that represents a barrier to charge transport of any particular type of ion. An important example of such an interface in a microcavity electrophoretic display is the boundary between the electrophoretic suspension including the suspending medium and particles (the "internal phase") and the surrounding medium including walls, adhesives and binders (the "external phase"). In many electrophoretic displays, the internal phase is a hydrophobic liquid whereas the external phase is a polymer, such as gelatin. Ions that are present in the internal phase are typically insoluble and non-diffusible in the external phase and vice versa. On the application of an electric field perpendicular to such an interface, polarization layers of opposite sign will accumulate on either side of the interface. When the applied electric field is removed, the resulting non-equilibrium charge distribution will result in a measurable remnant voltage potential that decays with a relaxation time determined by the mobility of the ions in the two phases on either side of the interface.

Polarization typically occurs during a drive pulse. Typically, each image update is an event that affects remnant voltage. A positive waveform voltage can create a remnant voltage across an electro-optic medium that is of the same or opposite polarity (or nearly zero) depending on the specific electro-optic display, as discussed below.

It will be evident from the foregoing discussion that polarization occurs at multiple locations within the electrophoretic or other electro-optic display, each location having its own characteristic spectrum of decay times, principally at interfaces and at material heterogeneities. Depending on the placement of the sources of these voltages (in other words, the polarized charge distribution) relative to the electro-active component (for example, the electrophoretic suspension), and the degree of electrical coupling between each kind of charge distribution and the motion of the particles through the suspension, or other electro-optic activity, various kinds of polarization will produce more or less deleterious effects. Since an electrophoretic display operates by motion of charged particles, which inherently causes a polarization of the electro-optic layer, in a sense a preferred electrophoretic display is not one in which zero remnant voltages are always present in the display, but rather one in which the remnant voltages do not cause objectionable electro-optic behavior. Ideally, the remnant impulse will be minimized and the remnant voltage will decrease below 1 V, and preferably below 0.2 V, within 1 second, and preferably within 50 ms, so that that by introducing a minimal pause between image updates, the electrophoretic display may effect all transitions between optical states without concern for remnant voltage effects. For electrophoretic displays operating at video rates or at voltages below +/−15 V these ideal values should be correspondingly reduced. Similar considerations apply to other types of electro-optic display.

To summarize, remnant voltage as a phenomenon is at least substantially a result of ionic polarization occurring within the display material components, either at interfaces or within the materials themselves. Such polarizations are especially problematic when they persist on a meso time scale of roughly 50 ms to about an hour. Remnant voltage can present itself as image ghosting or visual artifacts in a variety of ways, with a degree of severity that can vary with the elapsed times between image updates. Remnant voltage can also create a DC imbalance and reduce ultimate display lifetime. The effects of remnant voltage are therefore usually deleterious to the quality of the electrophoretic or other electro-optic device and it is desirable to minimize both the remnant voltage itself, and the sensitivity of the optical states of the device to the influence of the remnant voltage.

Several approaches to reducing or eliminating ghosting and visual artifacts resulting from remnant voltage are described in previous E Ink patent applications. For example, the aforementioned 2003/0137521 and copending application Ser. No. 10/879,335 describe so-called "rail stabilized" drive schemes in which the electro-optic medium is periodically driven to one of the "optical rails" (the two extreme optical states of the electro-optic medium) where a small remnant voltage does not have an appreciable effect on the optical state. Copending application Ser. No. 10/837,062, filed Apr. 30, 2004 (Publication No. 2005/0012980, now abandoned) describes controlling the capsule height and pigment level of an electrophoretic medium so that when switching to black and white a small remnant voltage will not cause a noticeable optical change.

While such approaches are useful for monochrome displays, they do not address the root cause of remnant voltage. In addition, while somewhat helpful for gray scale or color displays, these approaches do not completely solve the problem of addressing the system to gray levels, because gray levels in electrophoretic displays are typically dependent on mixing fractions of white and black particles without benefit of a physical wall to correct for differences in particle speed, and therefore gray scale addressing is typically more susceptible to small differences between the target waveform and the actual voltage experienced by the electrophoretic medium.

In the method described in the aforementioned 2003/0137521, a remnant voltage is measured, and a corrective balancing impulse is applied either immediately after each image transition, or periodically, to achieve a zero remnant voltage state. This is helpful for both monochrome and grayscale addressing. However, it is not always practical to measure remnant voltage using the means described in the aforementioned 2003/0137521.

The present invention seeks to provide additional addressing methodologies for electro-optic displays which will reduce ghosting caused by remnant voltage but which will not require measurement of remnant voltage at the pixel level. The present invention also seeks to provide additional addressing methodologies for electro-optic displays that do measure remnant voltage, but which are improved over the aforementioned method, as well as alternative means of measuring remnant voltage. The methods of the present invention may be useful in electro-optic displays other than electrophoretic displays. The present invention also seeks to provide electro-optic materials, manufacturing methods, and designs that will minimize remnant voltage. Reducing remnant voltage may be accomplished by reducing peak remnant voltage, accelerating the rate of voltage decay, or any combination thereof.

SUMMARY OF INVENTION

This invention provides improved addressing methods for electrophoretic and other electro-optic displays that exhibit remnant voltage. This invention also provides improved display electronics for electrophoretic and other electro-optic displays that exhibit remnant voltage.

In one aspect, this invention provides a method of driving a bistable electro-optic display having a plurality of pixels each of which is capable of displaying at least two gray levels. The method comprises applying to each pixel of the display a waveform determined by the initial and the final gray level of the pixel. For at least one transition from a specific initial gray level to a specific final gray level, at least first and second waveforms differing from each other are available. According to this aspect of the invention, the remnant voltage of a pixel undergoing the transition is determined prior to the transition, and the first or second waveform is used for the transition depending upon the determined remnant voltage.

This aspect of the present invention may hereinafter for convenience be referred to as the "waveform selection" method of the invention. In a preferred variant of this waveform selection method (hereinafter for convenience called the "dwell time waveform selection" method), the selection of the first or second waveform for use in the specified transition is based upon the dwell time of the relevant pixel, i.e., the period for which the relevant pixel has been in its initial gray level prior to the transition. The first waveform is used if the pixel has been in its initial gray level for less than a predetermined interval, and the second waveform is used if the pixel has been in its initial gray level of more than the predetermined interval. The dwell time waveform selection method may of course make use of more than two waveforms for the same transition. Thus, in one form of the dwell time waveform selection method, for the relevant transition, at least first, second and third waveforms, all different from one another, are used, the first waveform being used if the pixel has been in its initial gray level for less than a first predetermined interval, the second waveform being used if the pixel has been in its initial gray level for more than the first predetermined interval but less than a second predetermined interval, and the third waveform being used if the pixel has been in its initial gray level for more than the second predetermined interval. The first and second predetermined intervals will of course vary with the specific waveforms and electro-optic display being used; however, the first predetermined interval may be in the range of about 0.3 to about 3 seconds, and second predetermined interval in the range of about 1.5 to about 15 seconds.

The waveform selection method of the present invention may be carried out using a look-up table, as described in the aforementioned 2003/0137521. Thus, the waveform selection method may comprise:

storing a look-up table containing data representing, for each possible transition between gray levels of a pixel, the one or more waveforms to be used for that transition;

storing initial state data representing at least an initial state of each pixel;

storing dwell time data representing the period for which each pixel has remained in its initial state;

receiving an input signal representing a desired final state of at least one pixel of the display; and generating an output signal representing the waveform necessary to convert the initial state of said one pixel to the desired final state thereof, as determined from the look-up table, the output signal being dependent upon the initial state data, the dwell time date and the input signal.

Such a "look-up table waveform selection method of the invention may make use of any of the optional aspects of the look-up table method, as described in the aforementioned 2003/0137521, Ser. No. 10/814,205 and Ser. No. 10/879,335, and, without prejudice to the generality of the foregoing statement, may specifically make use of the prior state, temperature compensation and lifetime compensation aspects of the look-up table method as described in these copending applications. Thus, the look-up table waveform selection method may comprise storing data representing at least one prior state of each pixel prior to the initial state thereof, and generating the output signal dependent upon both the at least one prior state and the initial state of the relevant pixel. The look-up table waveform selection method may also comprise receiving a temperature signal representing the temperature of at least one pixel of the display and generating the output signal dependent upon the temperature signal. The look-up table waveform selection method may also comprise generating a lifetime signal representing the operating time of the relevant pixel and generating the output signal dependent upon the lifetime signal.

This invention also provides a device controller intended for use in carrying out the look-up table waveform selection method of the invention, and thus for controlling a bistable electro-optic display having a plurality of pixels, each of which is capable of displaying at least two gray levels. The controller comprises:

storage means arranged to store look-up table data representing, for each possible transition between gray levels of a pixel, one or more waveforms to be used for that transition, at least one transition having at least two different waveforms associated therewith, the storage means also being arranged to store initial state data representing at least an initial state of each pixel and dwell time data representing the period for which each pixel has remained in its initial state;

input means for receiving an input signal representing a desired final state of at least one pixel of the display;

calculation means for determining, from the input signal, the initial state data, the dwell time data and the look-up table, the waveform required to change the initial state of said one pixel to the desired final state; and output means for generating an output signal representative of said waveform.

In such a "look-up table waveform selection controller", the storage means may also be arranged to store prior state data representing at least one prior state of each pixel prior to the initial state thereof, and the calculation means may be arranged to determine the waveform dependent upon the input signal, the initial state date, the dwell time data, the prior state data and the look-up table. The input means may be arranged to receive a temperature signal representing the temperature of at least one pixel of the display, and the calculation means may be arranged to determine the waveform dependent upon the input signal, the initial state data, the dwell time data and the temperature signal. The controller may further comprise lifetime signal generation means arranged to generate a lifetime signal representing the operating time of the relevant pixel, the calculation means determining the waveform from the input signal, the initial state data, the dwell time data and the lifetime signal.

In another aspect, this invention provides an electro-optic display comprising a layer of electro-optic material and voltage supply means for applying a voltage not greater than a predetermined value in either direction across the layer of electro-optic material, wherein the electro-optic material has a threshold voltage which is greater than zero but less than about one third of the predetermined value.

This aspect of the invention may hereinafter for convenience be called the "low threshold" display of the invention. Such a low threshold display is intended to reduce the effect of remnant voltages on the display. In such a low threshold display, the electro-optic material may have a threshold voltage which is not less than about one-fiftieth but less than about one third of the predetermined value. The electro-optic material in such a low threshold display may be of any of the types previously described; however, the low threshold display is especially intended to use a particle-based electrophoretic material comprising a suspending fluid and a plurality of electrically charged particles held in the suspending fluid and capable of moving therethrough on application of a voltage across the layer of electro-optic material. The electrophoretic material may be, for example, an encapsulated electrophoretic material, a polymer-dispersed electrophoretic material or a microcell electrophoretic material. The suspending fluid may be liquid or gaseous.

In another aspect, this invention provides an electrophoretic medium comprising a suspending fluid, a plurality of a first type of electrically-charged particles held in the suspending fluid and capable of moving therethrough on application of an electric field to the electrophoretic medium, and a plurality of a second type of electrically-charged particles held in the suspending fluid and capable of moving therethrough on application of an electric field to the electrophoretic medium, the particles of the second type having a charge of an opposite polarity to the particles of the first type, wherein the total charge on the particles of the second type is from about one-half to about twice the total charge on the particles of the first type.

This aspect of the invention may hereinafter for convenience be called the "charge balanced dual particle electrophoretic medium" of the invention. The electrophoretic medium may be, for example, an encapsulated electrophoretic medium, a polymer-dispersed electrophoretic medium or a microcell electrophoretic medium. The suspending fluid may be liquid or gaseous. Desirably, such a charge balanced dual particle electrophoretic medium displays a remnant voltage of less than about 1 Volt, and preferably less than about 0.2 Volt, one second after the application thereto of a square wave addressing pulse of 15 Volts for 300 milliseconds.

In another aspect, this invention provides an electrophoretic medium comprising a suspending fluid, a plurality of a first type of electrically-charged particles held in the suspending fluid and capable of moving therethrough on application of an electric field to the electrophoretic medium, and a plurality of a second type of electrically-charged particles held in the suspending fluid and capable of moving therethrough on application of an electric field to the electrophoretic medium, the particles of the second type having a charge of an opposite polarity to the particles of the first type, the medium displaying a remnant voltage of less than about 1 Volt one second after the application thereto of a square wave addressing pulse of 15 Volts for 300 milliseconds.

This aspect of the invention may hereinafter for convenience be called the "low remnant voltage electrophoretic medium" of the invention. Desirably, such a medium displays a remnant voltage of less than about 0.2 Volt one second after the application thereto of a square wave addressing pulse of 15 Volts for 300 milliseconds.

In another aspect, this invention provides an electrophoretic medium comprising a plurality of discrete droplets of a suspending fluid dispersed in a continuous phase, the droplets further comprising a plurality of electrically-charged particles held in the suspending fluid and capable of moving therethrough on application of an electric field to the electrophoretic medium, wherein the continuous phase has a volume resistivity not greater than about one-half of the volume resistivity of the droplets, and that both the continuous phase and the droplets having a volume resistivity of less than about $10^{11}$ ohm cm. This aspect of the invention may hereinafter for convenience be called the "volume resistivity balanced electrophoretic medium" of the invention and may be of any of types previously discussed; thus, for example, the volume resistivity balanced electrophoretic medium may be an encapsulated electrophoretic medium with capsules walls surrounding the droplets and a polymeric binder surrounding the capsules, a polymer-dispersed electrophoretic medium or a microcell electrophoretic medium.

The present invention also provides additional improvements and design techniques for reducing the effects of remnant voltages on electro-optic media and displays, especially electrophoretic displays and media. For example, this invention provides an electrophoretic display comprising a material that has been selected or designed for its ability to carry a low peak remnant voltage or to permit remnant voltages to decay quickly (in short reduced remnant impulse). This invention also provides an electrophoretic display comprising a material that has been doped, treated, purified, or otherwise processed to reduce its capacity for carrying remnant voltages. This invention also provides an electrophoretic display comprising a binder and a laminating adhesive which are of similar composition, conductivity or ionic mobility. This invention also provides an electrophoretic display in which the interface between at least two adjacent components has been treated to reduce remnant voltage, or in which an intervening layer has been introduced at least partially to reduce remnant voltage. These aspects of the invention may hereinafter be collectively termed the "material selection" invention.

This invention also provides an electrophoretic display comprising conductive paths within a display pixel for the purpose of reducing remnant voltage. This aspect of the invention may hereinafter be termed the "conductive paths" invention.

This invention also provides an electrophoretic suspension comprising two species of charged particles, in which the total charge of each particle species is selected to reduce remnant voltage. This aspect of the invention may hereinafter be termed the "zeta potential" invention.

This invention also provides an electrophoretic suspension comprising an additive in the suspending fluid that reduces remnant voltage. This aspect of the invention may hereinafter be termed the "suspending fluid additive" invention.

This invention also provides external phase materials for a microcavity electrophoretic display with reduced remnant voltage. This aspect of the invention may hereinafter be termed the "microcavity external materials" invention.

This invention also provides methods of manufacturing electrophoretic and other electro-optic displays with reduced remnant voltage, and displays comprising means for determining remnant voltages.

BRIEF DESCRIPTION OF DRAWINGS

As already mentioned, FIG. 1 of the accompanying drawings is a graph showing a typical curve of the decay of remnant voltage with time in an electro-optic display.

DETAILED DESCRIPTION

Figure 1:
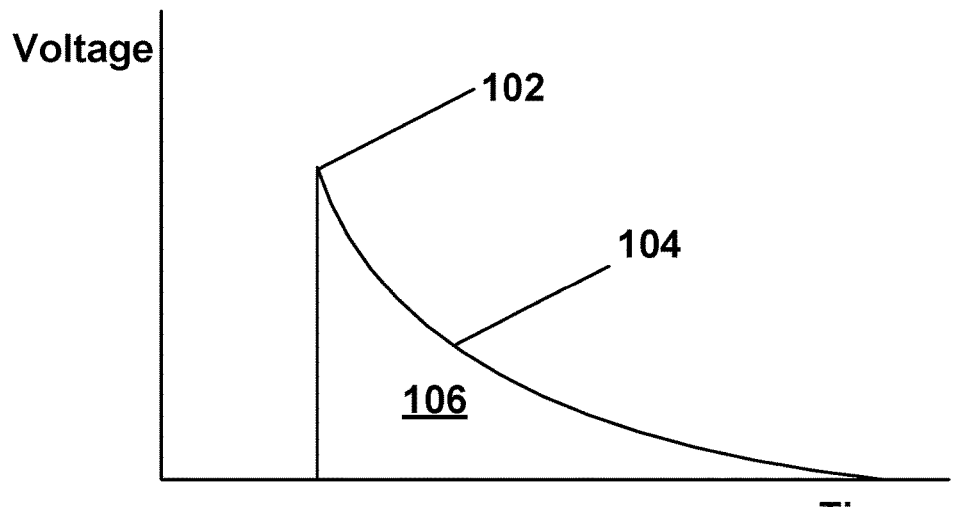

As already mentioned, the present invention provides several different improvements in electro-optic displays and media, and in waveforms and controllers for driving such displays. The various aspects of the present invention will be described separately (or in related groups) below, although it should be understood that a single display or medium may make use of more than one aspect of the present invention. For example, a single display may contain a volume resistivity balanced electrophoretic medium of the present invention and use a waveform selection method of the invention to drive this medium.

Methods for Determining Remnant Voltages, and Addressing Methods and Controllers for Electro-Optic Displays which Exhibit Remnant Voltages As already indicated, in view of the deleterious effects of remnant voltages on the optical performance of electro-optic displays, when a display is subject to such remnant voltages it is typically necessary or desirable to use an addressing method that minimizes the impact of remnant voltage.

For a given pixel of an electro-optic display, the state of the remnant voltage is greatly affected by the "image history", i.e., the electric fields that have been applied previously, and is thus affected by parameters such as the waveforms used, the electric field intensity, and the elapsed times between successive image updates.

One helpful class of addressing methods described in the aforementioned 2003/0137521 and Ser. No. 10/249,973 employs knowledge of the previous image data. A look-up table is employed in which, for example, the waveform for a black pixel being switched to white may be different, depending on whether the black pixel had previously been white, or had previously been gray (the transition from gray presumably being a different waveform that would have created a different amount of remnant voltage). Practically it has been found that such "prior n-state lookup tables" do tend to reduce ghosting attributable to remnant voltage.

There are, however, several disadvantages to this approach. Firstly, while the previous optical states are tracked, in some cases the algorithm used does not take into account the elapsed time between each image transition (change of optical state), and as a result the values chosen for the look-up table must be selected with some usage model in mind, for example, an update on average once per second. Secondly, this method requires additional memory, and to achieve higher accuracy, the size of the look-up table must be increased and the amount of memory required goes up further, especially as n increases past 2 or 3. As discussed in the aforementioned applications, in some cases the very large look-up tables required may be difficult to accommodate in portable devices.

In accordance with the waveform selection method of the present invention, an alternative approach is now proposed in which the remnant voltage of each pixel is first determined (or estimated by use of various parameters known to be related to remnant voltage), and thereafter one of two or more waveforms is selected based at least in part on the determined or estimated remnant voltage. Such a waveform selection method may make use of several possible approaches to estimating or predicting the remnant voltage based on known or measured display characteristics. A waveform selection method may also involve direct measurement of remnant voltage.

In an exhaustive method, the complete update history of each pixel may be recorded including both voltage applied and the elapsed times between image updates. A decay model is used to forecast the remnant voltage remaining from each previous update. Updates that occur a sufficiently long time (typically about 10 minutes) before the transition being considered may be ignored and their history erased because their contribution to remnant voltage level has been reduced essentially to zero. The remnant voltage of the pixel may then be modeled as the aggregate of remnant voltages from each previous relevant update.

In practice, a preferred approach requiring less memory is to track a single remnant voltage value and time stamp for each pixel. Prior to each image update, the remnant value for each pixel is reduced by an amount determined by the decay function of the display and the time stamp for the pixel is updated. After each update, the remnant voltage value is increased or decreased by an amount based on the actual waveform used, and the time stamp is updated. In this way, remnant voltage is tracked at all times but only two data values have to be stored per pixel.

The decay functions and change functions may be calculated in any suitable manner, such as by logical computation based on a formula and data parameters, through analog logic device, or by a look-up table with adequate gradations for the display application. The actual updating of the stored remnant voltage and time stamp values may occur in any suitable manner, such as a single step combining the results of both calculations. If a waveform used for an image update comprises a series of pulses spread over a long period (e.g. 300-1000 msec), it may be advantageous to update remnant voltage and/or time stamp values at intervals during the image update itself.

The decay function for a given display is highly sensitive to many factors, such as the materials, manufacturing methods, and system design features used in the display. Hence, it is necessary to vary the decay function or function parameter values for different electro-optic displays. In practice, due to the complexity of electro-optic media and displays, it has been found most useful to measure the display system experimentally for remnant voltage response and decay against a series of applied voltages and to thereby create a look-up table or to fit a function to the data. It may be helpful to repeat this measuring step periodically in the manufacturing process, for example when switching to new material set or making a batch change. It may also be helpful to individually characterize the decay function for each display after it is assembled, and to record the resulting parameters in a display controller.

The remnant voltage decay and response function for a given display may be affected by environmental factors such as temperature and humidity level. A sensor or user-selectable input value may be added to the display (or device containing the display) to track such factors. Thus, it may be advantageous to use a remnant response and decay function or look-up table that allows for these environmental parameters. It may also be advantageous to update the remnant voltage value regularly (e.g. every 30-300 seconds) regardless of whether the display has been updated so that the stored values allow for environmental changes such as temperature and humidity, and remain accurate.

If the pixels in a display are small, the overall remnant voltage on a pixel may be significantly affected by the remnant voltages of its neighbors. Accordingly, remnant voltage updating functions may be used that allow for lateral field effects, or a pre- or post-processing algorithm may be introduced to allow for such effects. Again, it may be useful to update the remnant voltage value periodically for each pixel in response to the remnant voltage values of its immediate neighbors, and to thereby achieve an adequately accurate estimate of actual remnant voltage values.

The foregoing discussion has focused on methods for estimating the remnant voltage based on system inputs and characteristics. An alternative approach is to measure the remnant voltage directly. Techniques for sensing the state of an electrophoretic display are described in U.S. Pat. No. 6,512,354. Similar techniques may be used for sensing the remnant voltage in other electro-optic displays. The aforementioned 2003/0137521 specifically describes the use of comparators to measure remnant voltage. Direct measurement of remnant voltage may be performed prior to each image update or periodically to update and correct the data values described above.

Estimating and direct measuring methods may be used together. For example, an estimating method may be used at each image update, but the remnant voltage value may be updated periodically based on actual measurement. Because the remnant voltage response and decay rate may change over the working lifetime of a display, which may be a period of years, it can be advantageous for display controller software to track such changes and to use an adaptive algorithm, for example a Bayesian algorithm, that updates its predictive parameters based on actual data.

Similarly, an estimating method may be used for each pixel, the remnant voltage value may be directly sensed at one or more test pixels, and the remnant voltage value for the remaining pixels adjusted, at least in part, based on the difference between the estimated and measure remnant voltage for the test pixels. The test pixels may or may not be pixels visible to an observer of the display.

In at least some cases, the remnant voltage characteristics of a display may be highly sensitive to the electrical properties of one or more specific layers of the display, for example, an adhesive layer. Accordingly, the foregoing approaches to estimating or measuring remnant voltage may be modified to estimate or measure the electrical characteristics of the specific layer (such as the adhesive layer) having a major effect on remnant voltage characteristics, and to modify the algorithms for the remnant values of the pixels appropriately. A sensor may be used to probe the specific layer of the display and may or may not probe material associated with visible pixels. Furthermore, a physical sample of the material of the relevant layer may be provided outside the display as part of a sensor that incorporates the material directly to measure its responses and changes over time.

Remnant Voltage Aware Waveforms and Addressing Methods

Having estimated or measured the remnant voltage (or a proxy variable) by the above or any other suitable methods, in accordance with the waveform selection method of the present invention, an addressing method is selected based at least in part on the estimated or measured current remnant voltage or proxy variable. The addressing method may be chosen based on the remnant voltage of a specific pixel, the remnant voltage of the pixel and the surrounding pixels, or on the overall remnant voltage across all or a portion of the display larger than one pixel and its immediate neighbors.

Various methods may be used to modify a standard waveform (i.e., a waveform which is not remnant voltage aware) to allow for remnant voltage of a specific pixel or group of pixels. For example, the remnant voltage may be subtracted from the desired waveform and a reduced voltage applied, so that the effective waveform experienced by the pixel is the original desired waveform. Alternatively, a scaling factor or other transformation may be applied to the waveform. Alternatively, the voltage levels in the waveform may be held unchanged, but their durations may be adjusted. For example, if a standard waveform requires a 10 V 50 ms pulse, but the pixel has a 2 V remnant voltage, the pulse may instead be 40 ms at 10 V, 50 ms at 8 V, 44.7 ms at 8.94 V, or even two pulses of 20 ms at 10 V with an intervening pause of 10 ms at 0 V (for simplicity these examples do not take account of the decay rate of the 2 V remnant voltage and could be adjusted more precisely to match the expected remnant impulse decline from an initial value of 2 V). These waveforms may also be adjusted to allow for the fact that it is not necessarily ideal for the net impulse to be exactly constant, since the electro-optic medium may have a slight threshold or be otherwise asymmetric in its optical response to the voltage or duration of a pulse in a waveform.

Direct calculation of waveform adjustments in this manner may impose a significant overhead on the display controller. To reduce such overhead, the controller may instead select an addressing waveform, algorithm, formula or look-up table from a series of options, each associated with a range of remnant voltage values. Thus, the waveform selection method of the present invention extends to the selection of from among two or more essentially equivalent waveforms (waveforms that do not substantially differ in the final optical state of the pixel after the waveform has been completed) so as to minimize the change in aggregate remnant voltage within a pixel (i.e., to yield a very low remnant voltage waveform). The optimum waveform may be determined by modeling the decay rates of the electro-optic medium or by direct experimentation and a process of tuning and optimization for the waveforms. The waveform selection method of the present invention also extends to selecting among essentially equivalent waveforms that generate equivalent or non-minimal remnant voltages, choosing the waveform that brings the net remnant voltage of a given pixel closer to zero; such a waveform may be called an "off-setting remnant voltage waveform".

As described in the aforementioned Ser. No. 10/814,205 and Ser. No. 10/879,335, it is possible, and often desirable, to use drive schemes in which the waveforms used for individual transitions are DC-balanced (as opposed to the overall drive scheme being DC-balanced). In other cases, specific parts of a waveform may be DC-balanced even if the entire waveform is not DC-balanced; examples are shake-up pulses, blanking pulses (see below), and many rail-stabilized addressing methods. During such DC-balanced waveform sequences, as part of a sequence which involves a pixel being driven to both its extreme optical states (hereinafter assumed for convenience to be black and white) the controller may select in which direction to switch first, towards white or towards black. When a switch to one extreme optical state is followed by a switch to the other extreme optical state, the second switch will normally have a greater impact on remnant voltage simply because it occurs later in time and the effects of remnant voltage decay with time. Thus, in a DC-balanced waveform sequence, selecting whether to switch towards black or white first can determine whether the remnant voltage for a given pixel is slightly increased or decreased. This is another example of an offsetting remnant voltage waveform of the invention.

Some drive schemes require a periodic (typically every 10 minutes or so, or every image update) blanking pulse which drives a pixel to both extreme optical states; see, for example, the aforementioned 2003/0137521. For example, the blanking pulse can switch the display to all-white then all-black, or to all-black then to all-white. In accordance with the waveform selection method of the present invention, a choice between these alternatives can be made to reduce remnant voltage and thus to reduce perceived ghosting. Alternatively, by determining whether the pixels of the display have, overall, positive or negative remnant voltages, the total remnant voltage on the display may be reduced by choosing the appropriate blanking sequence (black/white or white/black) without increasing the image update time. In a variation, the decision as to which optical rail (extreme optical state) to hit first is not based on the aggregate remnant voltage but is based on the number of pixels that have high remnant voltage in either direction. More generally, any suitable algorithm may be used to determine to which rail the medium will be driven first in order to minimize outliers or other distracting visual artifacts of the display caused by remnant voltages, given the user preferences for the targeted application.

If desired, the algorithm may also provide for introducing an additional blanking sequence (white-black-white or white-black-white-black) when the remnant voltages are extreme in one or both directions. It will be apparent that the voltage level of the blanking pulse on each pixel could be modified instead of its duration.

The waveform selection method of this invention also extends to extending the period of a voltage pulse during the time when the electro-optic medium is already in an extreme optical state (i.e., is at an optical rail), thereby increasing or decreasing remnant voltage without a distracting optical change. An opportunity for such voltage pulse extension exists every time a pixel is brought to an extreme optical state. The blanking pulses mentioned above are one example. The waveform selection method therefore provides for the blanking pulse duration (or voltage) to be varied on a pixel-by-pixel basis. By lengthening the pulse in either direction on a calculated basis for each pixel, a net remnant voltage component may be applied, and the total remnant voltage for that pixel thereby reduced or eliminated. Thus, a blanking pulse could be used to reduce remnant voltage across all pixels of the display without apparent optical impact. As a practical matter, the degree to which the pulse is lengthened could be quantized, i.e., the pixels could be grouped into categories based on remnant voltage ranges and the same adjustment applied to all the pixels in each category.

So-called "rail stabilized" drive schemes are known (see, for example, the aforementioned 2003/0137521, Ser. No. 10/814,205 and Ser. No. 10/879,335), which allow any given pixel to undergo only a limited number of transitions without touching an optical rail, and thus provide for each pixel to be switched to one of its extreme optical states on a frequent basis. For example, to transition a pixel from one gray level to another gray level, the pixel may be switched first to either a dark or a white state (possibly for an extended period) and then a subsequent pulse applied to reach a desired gray level. Such a transition tends to create positive or negative remnant voltage by virtue of the long period in which the pixel is addressed toward the extreme optical state. According to the waveform selection method of the present invention, the remnant voltage of the pixel may be minimized by causing the transition to use the optical rail for which the remnant voltage created by the direction of the switch will tend be opposite in sign to the remnant voltage carried by the pixel just prior to the transition.

One reason for using a rail-stabilized drive scheme is to mitigate the optical effects of remnant voltage. The estimate of measurement of remnant voltage on a pixel-by-pixel level, as described above, can reduce the need for the use of such rail-stabilized drive schemes. A hybrid approach is to use rail-stabilized methods for pixels in which remnant voltage is fairly high, but to switch directly to the desired state (a direct impulse method) when remnant voltage is low and would not affect the image.

Another approach to reducing remnant voltage is to identify pixels for which the remnant voltage is extreme (i.e., has a magnitude greater than some predetermined value), and, prior to a general image update, to apply an off-setting voltage to such pixels to reduce their remnant voltages, or otherwise pre-condition the remnant voltage levels across the display. Such pre-conditioning may enable a reduced period of rail stabilization and achieve a faster perceived image update time. If the off-setting voltage is small and applied over a sustained time, or if it tends to lengthen a period of rail stabilization rather than pull the particles back from the rail, the reduction of remnant voltages may be accomplished without distracting visual impact.

The above discussion has focused on tracking net remnant voltages and selecting appropriate algorithms for reducing remnant voltages. Another parameter of image history of a pixel or display is net DC imbalance. It will be apparent to one skilled in the imaging art that most of the methods described above can be modified to track and correct for net DC imbalance, either in combination with, or independently from, any adjustments for remnant voltage. For example, DC imbalance can be used when determining which optical rail to select first and what pre-conditioning is appropriate in the above approaches. Also, for example, even when remnant voltage may be reduced by modifying a waveform, the drive scheme could omit this correction if the pixel is already DC-imbalanced and would become more imbalanced after the adjustment for remnant voltage. Similarly, any conditioning of the display or adjustment of waveforms to achieve a net DC balance would be allowed for when estimating the remnant voltage across each pixel.

Thus, the waveform selection method of this invention may be generalized as an addressing method for an electro-optic display capable of exhibiting a remnant voltage, wherein a data value corresponding to remnant voltage is determined and an addressing waveform is selected at least in part based on the remnant voltage value. In such a method, time and remnant voltage values, or data representing each, are typically explicitly tracked. However, it should be recognized that addressing waveforms for electrophoretic and other electro-optic displays may account for time and remnant voltage values implicitly or approximately. For example, the so-called "prior n-state" addressing methodologies described the aforementioned 2003/0137521, Ser. Nos. 10/814,205 and 10/879,335 and above may not track time, but they do track a history of prior pixel optical states, and this can be a proxy for time if the drive scheme designer has some knowledge of typical usage models and common elapsed times between image updates. Hence, it is now recognized that such methods tend to reduce remnant voltage and thus show improved ghosting behavior.

One practical reason why such methods have previously been used is that the display controller in many electro-optic displays does not have access to clock information to track elapsed time between image updates, perhaps because such elapsed time data is most useful for bistable displays and few bistable displays have hitherto been commercialized. In a preferred form of the waveform selection method of the present invention, the controller does comprise a clock or equivalent timing mechanism. Alternatively, the controller may be in logical communication with an external information source (such as the device which uses the display as its output device) that generates an elapsed time value and provides this information to the controller. For example, the device may provide time information along with a function call to the display controller or along with each new set of image data. Such time information may be quantized (e.g. immediate, 0.5 second, 1 second, 2 seconds, 10 seconds, 30 seconds, 60 seconds, more than 60 seconds) thereby reducing data bandwidth and yet still providing useful information, especially if the quantized time bands are chosen to correspond to the substantially exponential decay of the remnant voltage.

In general, it is most useful for the controller to receive elapsed time data for each pixel, since some pixels may not change during an update. However, it is still useful for the controller to receive data corresponding to the elapsed time since the most recent image update, most recent blanking pulse, or most recent update for a set of pixels. Additionally, the controller may receive data indicating the likely update frequency of the display, for example, a flag indicating whether the user is currently entering text, which may require many updates in rapid succession to the whole display or to a defined region thereof.

Another form of approximate correction of remnant voltage is used in the dwell time waveform selection method of the present invention, which provides for choice among multiple waveforms to effect an image transition, where the selection among the multiple waveforms is based at least in part on the dwell time of the relevant pixel in its initial gray state, or some proxy for this dwell time. Such time-sensitive selection among multiple waveforms implicitly accounts for the decay of remnant voltage with time, even though remnant voltage is not explicitly tracked, estimated or measured.

For example, a specific dwell time waveform selection method of the present invention might be applied to a controller for a display with four gray levels using a drive scheme based on a logical transition table with 16 entries, each entry corresponding to the transition from one gray level (0,1,2,3) to another (0,1,2,3). Selection of the entry is based on knowledge of the initial and final gray levels of the desired transition. Within each entry, there are three possible waveforms. The controller selects the first waveform when the image transition occurs within 1 second after the prior image update, the second waveform when the image transition occurs between 1 and 5 seconds after the prior image update, and the third waveform when the image transition occurs more than 5 seconds after the prior image update.

In the dwell time waveform selection method, the waveforms may be represented by look-up tables (as described above), may be modified (or split into sub-tables) to allow for variation in environmental conditions, and may be set in whole or in part during manufacture of the display to include specific parameters of an individual display. In short, the waveforms used in this method may include any of the optional components and variations described in the aforementioned 2003/0137521, Ser. No. 10/814,205 and Ser. No. 10/879,335.

From the foregoing it will be seen that, although in the dwell time waveform selection method of the present invention remnant voltage is not explicitly tracked, and although the elapsed time may be based on elapsed time since the display was updated and not on elapsed time since a specific pixel was updated, the dwell time waveform selection method does implicitly approximate both remnant voltage and elapsed pixel update time and therefore exhibits improved ghosting behavior over prior art drive schemes.

Materials Selection

As already indicated, the selection of materials for use in electro-optic displays can have a major influence on the remnant voltages which exist in such displays during their operation, and hence upon the electro-optic performance of such displays.

Also as discussed above, when used in an electro-optic display certain materials exhibit Type I polarization which contributes to remnant voltage. It is believed (although the invention is in no way limited by this belief) that this polarization is frequently due to the mobility and concentration of ions moving through at least one of the component materials.

The speed of decay of remnant voltage may be measured in any specific material by preparing a test cell in which the material is in contact with the same interfaces as in the proposed display. For example, test cells have been prepared consisting of a controlled thickness of laminating adhesive coated onto an ITO substrate, and an electric field applied across the laminating adhesive/ITO interface. Remnant voltage peak values and decay were then measured by opening a charging circuit, and monitoring the voltage across the pixel with a high impedance voltmeter.

It has been found that laminating adhesives with higher ionic mobility show faster remnant voltage decay rate. A preferred lamination adhesive has a volume resistivity of less than about $10^{11}$ ohm cm.

Previous E Ink patent applications, for example the aforementioned U.S. Pat. No. 6,657,772 and Patent Publication No. 2003/0025855, and application Ser. No. 10/708,121, filed Feb. 10, 2004 (Publication No. 2004/0252360, now U.S. Pat. No. 7,110,163), describe lamination adhesives with controlled resistivities, or which are heterogeneously or anisotropically conductive, for example Z-axis adhesives. Such adhesives may provide a further benefit of reducing remnant voltage.

A lamination adhesive may also exhibit Type II polarization. In test cells, increased adhesive thickness has been found to be associated with higher remnant voltage. Since polarization at the interfaces should be independent of the film thickness, this result suggests the existence of internal charge polarization sites, characteristic of Type II polarization effects. Consequently, care must be taken in the selection of the adhesive thickness and, in the case of encapsulated electrophoretic displays, its morphology around the capsules. The same test lamination adhesive was heated to drive out suspected impurities and crystalline regions. Thereafter it exhibited reduced remnant voltage.

Type I polarization may occur anywhere in the display where a material interface exists. It has been found that, by using the same material for lamination adhesive and binder (i.e., the material used to surround the capsules and form them into a cohesive layer, as described in many of the aforementioned E Ink and MIT patents and applications), an interface is eliminated and the remnant voltage is reduced. Therefore, the present invention provides an electrophoretic display comprising a microcavity binder and a laminating adhesive in which the materials are either identical or similar in composition or electrically equivalent in conductivity or ionic mobility. In some cases where the materials are different in composition, it may be desirable to dope the less conductive material to achieve substantially equal ionic mobility on both sides of the interface.

Type I polarization at some interfaces can be affected by surface roughness. It may be advantageous either to planarize or to introduce a texture to some interfaces, thereby providing a degree of interpenetration of the materials on either side of the interface. These techniques may result in either increased polarization at the specific interface or in decreased polarization, either of which could be beneficial depending upon the specific display being considered. For example, increased polarization at one location that offsets polarization elsewhere in the display may cause a reduced remnant voltage across an electro-optic medium. Typically if the interface results in a remnant voltage that is strongly coupled to the electro-optic medium, then reducing the degree of polarization at the interface and its decay rate is desirable.

Type I polarization at some surfaces may also be affected by surface cleanliness. Cleaning of substrates prior to coating and lamination is desirable in order to achieve consistent electrical behavior.

Conductive Paths in Electrophoretic Layer

In microcavity electrophoretic displays, a cell wall (a term which is used herein to include the capsule wall of an encapsulated display) exists that is electrically in parallel with the electrophoretic internal phase (the suspending fluid and the electrically charged particles). Current, in the form of electrically charged ions, can flow through the internal phase or through the cell wall. The cell wall can be a polymer, such as a gelatin, or any other suitable material. The cell wall is typically further surrounded by a binder, as mentioned above. Therefore, some current may flow between the electrodes of the display via the binder or cell wall without flowing through the electrophoretic internal phase, and thus without contributing to changes in the electro-optic state of the display or a pixel thereof.

In the preferred electrophoretic displays described in the aforementioned E Ink and MIT patents and applications, the conductivities of the cell wall and binder are typically slightly higher than those of the internal phase. Relaxation of remnant voltage may thus occur in part through the binder and cell wall.

During the application of an electric field to the electrophoretic medium, charged particles move toward the two electrodes of the display. If charged particles cluster near the front electrode (the electrode through which an observer normally views the display) for a period of time, corresponding electrons or oppositely charged ions may flow through the cell wall and/or binder in response. The charged regions thus created may create a remnant voltage that affects a subsequent image update. Consequently, the conductivities and ionic mobilities of the cell wall and binder are of importance, as are their morphologies.

The remnant voltage of a specific cell/binder morphology may be measured by methods similar to those described above for a lamination adhesive. In accordance with the volume resistivity balanced electrophoretic medium aspect of the present invention, it is preferred that the binder and cell walls have a volume resistivity at least two times less than the volume resistivity of the electrophoretic internal phase and that both have a volume resistivity of less than about $10^{11}$ ohm cm. More generally, in an electrophoretic medium comprising a plurality of discrete droplets of a suspending fluid dispersed in a continuous phase (which may have the form of a single continuous phase in a polymer-dispersed medium, a combination of cell walls and binder in an encapsulated electrophoretic medium, or cell walls only in a microcell electrophoretic medium), the droplets comprising a plurality of electrically-charged particles held in a suspending fluid and capable of moving therethrough on application of an electric field to the electrophoretic medium, it is preferred that the continuous phase have a volume resistivity not greater than about one-half of the volume resistivity of the droplets, and that both the continuous phase and the droplets have a volume resistivity of less than about $10^{11}$ ohm cm. In a preferred embodiment, the binder and cell walls occupy between about 5 and about 20% by volume of the electrophoretic layer (with the remainder being the electrophoretic internal phase), and the binder is evenly distributed among the capsule walls.

Zeta Potential Considerations, and Charge Balanced Dual Particle Electrophoretic Medium A preferred type of electrophoretic medium described in many of the aforementioned E Ink and MIT patents and applications is a so-called "opposite charge dual particle" medium, in which the electrophoretic internal phase contains two different types of particles bearing charges of opposite polarity (see, for example, the discussion of the different types of electrophoretic media in the aforementioned 2002/0171910). The amount of charge on each particle may be controlled, for example by surface modification as described in U.S. Patent Publication No. 2002/0185378 (now U.S. Pat. No. 6,870,661), and in copending application Ser. No. 10/711,829, filed Oct. 7, 2004 (now U.S. Pat. No. 7,230,750). The number of particles in each microcavity may also be controlled in a predictable way by selecting the total amount of particles provided in the electrophoretic internal phase prior to encapsulation or filling of microcells. By multiplying the average charge per particle by the average number of particles per microcavity, it is possible to estimate the total charge of each type of particle in the microcavity.

It has been found that if the total charges of the oppositely charged types particle are not approximately balanced, a particularly large polarization is produced in the polarized microcavity, which induces a corresponding large and slowly decaying polarization in the continuous phase material(s). It has further been found that by varying the net total charge of the particle types, it is possible to vary an encapsulated electrophoretic display between a regime in which an electric field leaves a remnant voltage of the same sign (so that a subsequent update in the opposite direction is retarded), a regime in which very little remnant voltage occurs, and a regime in which an electric field leaves a remnant voltage of the opposite sign (so that a subsequent update in the opposite direction is promoted).

In accordance with the charge balanced dual particle aspect of the present invention, it is preferred that neither type of electrophoretic particle have more than about twice the total charge of the other. It is also preferred, in accordance with the low remnant voltage electrophoretic medium aspect of the present invention, that, in an opposite charge dual particle electrophoretic display, the particle charge, particle mass, and particle mobility be selected so that the display exhibits "Low Remnant Voltage Behavior", herein defined as having a remnant voltage measuring less than about 1 V (and desirably less than about 0.2 V) exactly 1 second after the application thereto of a square wave DC addressing pulse of 15 V for 300 milliseconds.

To assess charge balance in an opposite charge dual particle electrophoretic internal phase, it is helpful to analyze the charge on each particle relative to its mass (since mass can be easily measured at the time of manufacture). It is believed, although the invention is in no way restricted by this belief, that the charge to mass ratio may be estimated using the following relationship:

$$q/M \text{ is proportional to } \zeta/d^2 \tag{1}$$

where:
q=particle charge
M=mass
ζ=zeta potential (mV)
d=particle diameter.

The total net charge of the electrophoretic internal phase should desirably be controlled by careful co-optimization of particle charge, particle mass, particle diameter, and zeta potential.

In a substantially charge-balanced electrophoretic medium exhibiting Low Remnant Voltage Behavior (as defined above), such behavior may typically cease if any of the following occurs: (a) the average charge on either type of particles is changed by about 20% to 100%; (b) the relative mass of one type of particle is changed by about 50% to 300%; (c) the average diameter of one type of particle is changed by about 30% to 200%; and (d) the average mobility of one type of particle is changed by about 20% to 100%.

Suspending Fluid Additives

It has been found that the addition of surfactants to the suspending fluid of the electrophoretic medium may reduce remnant voltage. For example, when single pixel displays were prepared using otherwise identical dual particle opposite charge electrophoretic media but in which sorbitan trioleate (sold commercially as Span 80) was added to one of the suspensions, the display containing the sorbitan trioleate demonstrated reduced remnant voltage.

It is believed, although the invention is in no way restricted by this belief, that the surfactant alters the relative charge balance of the two types of electrophoretic particles. It is further believed that the surfactant reduces Type III polarization by modifying charge relaxation rates in the electrophoretic internal phase so that they more closely balance the corresponding relaxation rates in the external phase.

Thus, this invention provides an electrophoretic display exhibiting Low Remnant Voltage Behavior (as defined above), which behavior ceases if the concentration of a surfactant or charge control agent in the electrophoretic internal phase is changed by about 30% to 200%.

Materials for External Phases of Microcavity Electrophoretic Displays

It is possible to select external phase materials for use in microcavity electrophoretic displays, or to mix, dope or condition such materials, to achieve desired remnant voltage relaxation rates. As described above, the relaxation rate of an internal phase may be affected by numerous factors, including the choice of electrophoretic particle(s) and the concentration of surfactants and charge control agents. One aspect of the present invention provides that the external phase materials and the internal phase materials be balanced (within a factor of 2) in relaxation rates.

This aspect of the invention provides an electrophoretic display exhibiting Low Remnant Voltage Behavior (as defined above), which behavior ceases if the conductivity of the external phase materials is changed by about 30% to 200%.

In a typical encapsulated electrophoretic display, a critical external phase material is the gelatin capsule wall. The conductivity of the wall is significantly affected by moisture. In a preferred embodiment, the electrophoretic display comprises moisture and is resistant to changes in the relative humidity (RH) of the operating environment. In a further preferred embodiment, the display is conditioned (by placing it in a controlled humidity environment until it has come to equilibrium and/or by manufacturing the display in a controlled humidity environment) so as to achieve between 20% RH and 55% RH, and preferably 35% RH, for the electrophoretic layer within the final display.

Thus the invention provides a method of manufacturing an electrophoretic display that comprises RH conditioning the display material. The electrophoretic display may also comprise moisture barriers or substrates that are impermeable to water.

Low Threshold Electro-Optic Displays

A small threshold in an electrophoretic or other electro-optic display may be produced in many ways. The threshold can result from attractions between particles and walls, or among particles. The attractions can be electrical, such as from oppositely charged particles; physical, such as from surface tension; or magnetic. A threshold can also result from the nature of a suspending fluid, which may be strongly shear-thinning, or have an apparent yield stress (such as for a Bingham fluid), or electro-rheological properties. An additional electrical field, for instance a field created by in-plane electrodes or a control grid, can substitute for a threshold.

For purposes of this application, a threshold is considered present at a particular voltage level when a square wave DC pulse of 1 second duration applied to the display at that voltage level results in an optical change of less than 2L*.

It is known in the display art that a threshold in an electro-optic medium can serve as a basis for a passive addressing scheme. Typically such a scheme relies on a threshold equal to half of the switching voltage ("V/2"); in some drive schemes, passive addressing can be achieved with a minimum threshold of one-third of the switching voltage ("V/3").

In contrast, as described above, a threshold of as little as 1 V, as compared with a switching voltage of ±15 V, can be useful in reducing the impact of remnant voltages on electro-optic performance. Accordingly, the low threshold display aspect of the present invention provides an electro-optic display operating at a voltage not greater than ±V, wherein the electro-optic material has a threshold voltage which is greater than zero but less than about V/3.

Manufacturing Electrophoretic Displays with Reduced Remnant Voltage

A final aspect of the present invention relates to various improvements in the manufacture of electrophoretic displays to reduce the remnant voltages exhibited by the displays thus manufactured.

During the manufacture of encapsulated electrophoretic displays, capsules are typically suspended in a slurry, which comprises the capsules and a polymeric binder, and may also comprise various additives, for example water, plasticizers, pH adjusters, biocides, and surfactants or charge control agents. For present purposes, such a slurry may be regarded as containing a "binder" consisting of the nonvolatile components of the slurry, excluding the capsule. In some cases, the binder materials may separate during preparation of the slurry, or during shipment and storage, and may not always be mixed adequately prior to coating. As a result, regions of area-to-area heterogeneity may exist that can cause Type II polarization problems in the final display. To reduce such problems, it is desirable to thoroughly mix such binder materials through appropriate means such as mixing by propeller blade or on a roll mill for extended periods.

The dried binder material should desirably have uniform electrical characteristics such that, following a 15 V voltage pulse applied for 300 ms and a 1 second pause, the measured remnant voltage of the binder material itself should be less than about 1 V, and preferably less than 0.2 V.

As mentioned above, it is desirable to control the amount of space between capsules that is occupied by binder because this space can contribute to Type III polarization. Electrodeposition may be used to control capsule spacing directly, as described in copending application Ser. No. 10/807,594, filed Mar. 24, 2004 (Publication No. 2004/0226820; see also the corresponding International Application PCT/US2004/009421, Publication No. WO 2004/088002). In microcell or photo-patterned electrophoretic displays, microcavity spacing can be controlled directly.

In coated encapsulated electrophoretic displays, dried capsule spacing and morphology are the result of many controllable factors, as discussed in several of the aforementioned E Ink and MIT patents and applications. To summarize, capsule morphology can be adjusted by varying capsule wall thickness and elasticity, the formulation of the coating slurry, the surface energy of the coating substrate, the height of the coating die off the substrate, the amount of coating slurry passing through or pumped through the die onto the substrate, the speed of a substrate web, and the drying conditions of the wet coated film such as temperature, duration and air flow. Useful principles for control of capsule spacing and morphology are described below.

A: Capsule Wall Property Effects on Dried Capsule Shape

Capsule wall properties vary with materials and process variables of encapsulation, especially mixing speed. The capsule wall should desirably be elastic enough to allow an overall capsule height/diameter ratio between 0.33 and 0.5. However the capsule wall should also ideally permit local variations enabling nearly a 90-degree bend radius on sharp corners for hexagonal close packing of the capsules on the substrate on to which they are coated, as described for example in U.S. Pat. Nos. 6,067,185 and 6,392,785.

It is believed (although the invention is in no way limited by this belief) that capsule wall elasticity can be affected by the degree of cross-linking of the capsule wall material (less cross-linking typically giving a more flexible capsule wall) and by the thickness of the wall. Wall thickness is affected by internal phase formulation, gelatin/*acacia* levels and process parameters. For a given capsule packing pattern, reducing the wall thickness can improve the "aperture ratio" (i.e., the fraction of the area of the electrophoretic medium which undergoes change of optical state; the areas occupied by the capsule walls cannot undergo such change) of the medium; however, walls that are too thin may burst easily.

Certain process parameters that have been found important in affecting wall thickness are set out in the Table below. The results shown in the Table were generated through encapsulation experiments done at a 4 L scale. Also shown in the Table are the relative qualitative rankings for the wall thickness compared to a standard operating procedure for encapsulation. The standard process conditions for the 4 L encapsulation are *acacia* level (index at 100% of standard level), pH (4.95), emulsification temperature (40° C.), cooling rate (3 hours), and rate of internal phase addition. In the Table, a Rank of 3 denotes walls of standard thickness, with 1 denoting a very thin wall and 5 a thick wall.

TABLE

| Effect on wall thickness Parameter | Rank Low | Rank High |
|---|---|---|
| *Acacia*: 25% variation in mass | 3 | 1.5 |
| pH: 3% variation on pH scale | 3 | 2 |
| Emulsification Temp: 10% variation | 4 | 3 |
| Cooling Rate: ±2 hours | 2 | 4 |
| Rate of IP addition: Spray/Dropwise | 2.5 | 3.5 | pH is a critical parameter for the wall properties, not just in terms of the wall thickness but also because the solid content and viscosity of the coacervate are quite different at different pH levels. Finally, the type of gelatin and *acacia* used may have a dramatic impact on the wall properties.

B: Binder Evaporation as a Mechanism for Changing Dried Capsule Shape

The effect of binder evaporation varies depending on how closely packed the capsules were while the coated slurry was still wet. The same binder ratio, with the same capsule diameters, may result in either flattened (oblate ellipsoidal) or tall (substantially prismatic) capsules according to wet capsule proximity.

Figure 2:
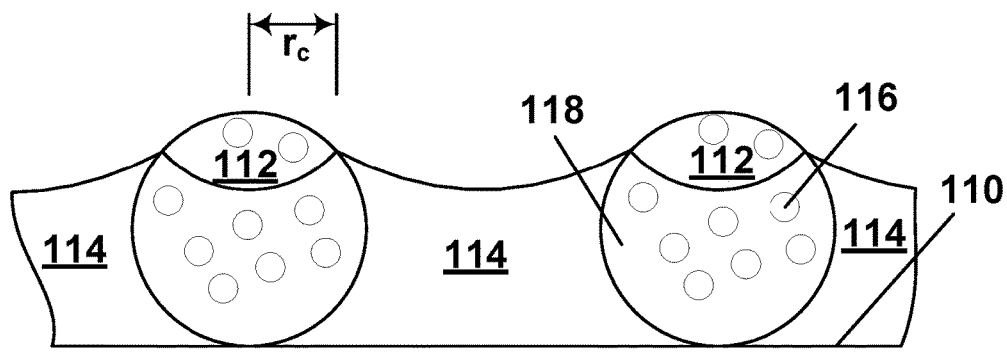
FIG. 2 is a schematic side elevation showing the contact circle between capsules and surrounding liquid during the coating of an encapsulated electrophoretic medium.

FIG. 2 shows the situation where a capsule/binder slurry has been coated on a substrate 110 so that the capsules 112 are sparsely coated, i.e., are separated from one another by gaps comparable to the diameter of the capsules 112. The capsules 112 comprise electrically charged particles 116 in a suspending fluid 118. As shown in FIG. 2, in these circumstances the capsules 112 are only partially immersed in the uncured binder 114, so that the portions of the capsules 112 remote from the substrate 110 protrude from the layer of binder 114, and the boundary between the binder and each capsules is a circle of radius $r_c$ around each substantially spherical capsule. It can be shown that the downward force exerted on a capsule by surface tension forces during drying is given by:

$$F = 2\pi \sigma r_c \sin \psi_c$$

where:
F is the downward force on the capsule;
σ is the surface tension of the liquid surrounding the capsule;

$r_c$ is the radius of the contact circle which the liquid makes with the capsule, as illustrated in FIG. 2; and $\psi_c$ is the complement to the contact angle of the liquid surrounding the capsule (i.e., 90°—the contact angle).

From FIG. 2, it will be seen that $r_c$ will increase as the capsules increase in size and as the level of the surrounding liquid is lowered.

Figure 3A:
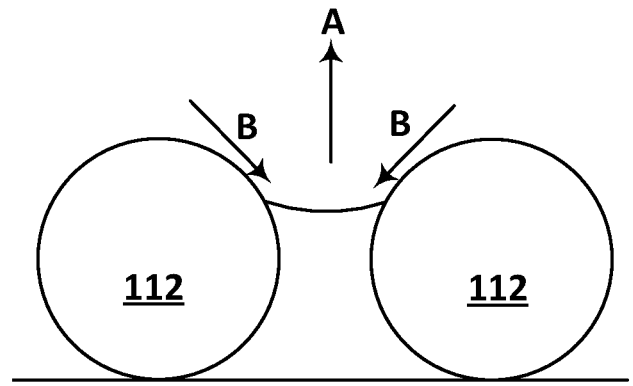
FIG. 3A is a schematic side elevation illustrating the forces acting on sparsely coated capsules during the coating of an encapsulated electrophoretic medium.
Figure 3B:
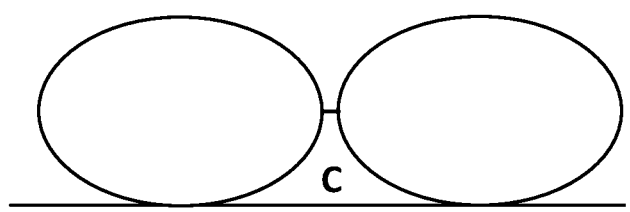
FIG. 3B is a schematic side elevation, similar to that of FIG. 3A but showing the form of the capsules in the final dried capsule layer as a result of the forces illustrated in FIG. 3A.
Figure 4A:
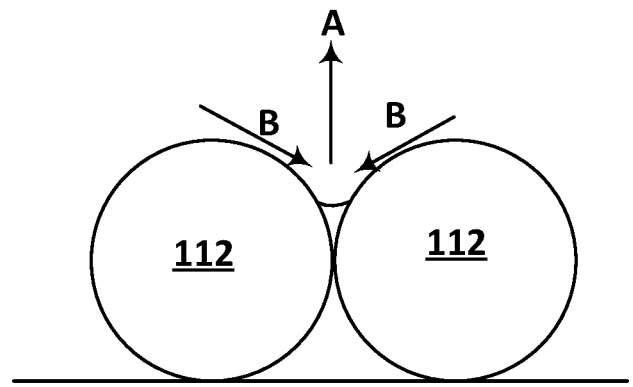
FIGS. 4A and 4B are schematic side elevations, similar to those of FIGS. 3A and 3B respectively, showing the forces acting on closely packed coated capsules and the form of the capsules in the final dried capsule layers.
Figure 4B:
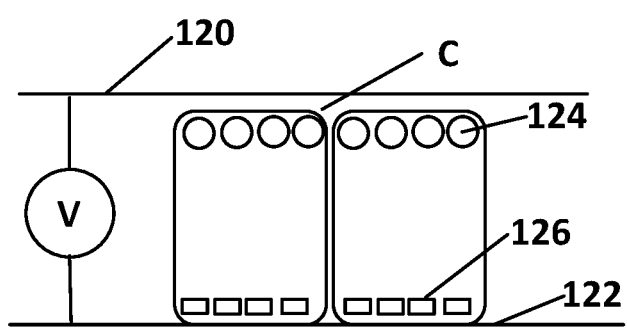

Two extreme cases of the effects of this downward force are shown in FIGS. 3A-3B and 4A-4B respectively of the accompanying drawings. In FIGS. 3A and 4A, arrows A denote evaporation of water from the wet binder, while arrows B denote the forces on the capsules exerted by surface tension. In FIGS. 3B and 4B, "C" denotes dried binder. (Note that throughout FIGS. 3A to 4B, the presence of binder outside the two illustrated capsules is ignored.) FIGS. 3A and 3B illustrate the effects of the downward force on sparsely coated wet capsules, i.e., capsules coated so as to leave gaps between adjacent capsules which are a substantial fraction of a capsule diameter. From FIGS. 3A and 3B, it will be seen that the effect of the downward force is to flatten the original spherical capsules into oblate ellipsoids, which typically will touch each other in the final dried layer, but that little or no distortion of these ellipsoids occurs by contact between adjacent capsules. In contrast, FIGS. 4A and 4B illustrate the effects of the downward force on closely packed coated wet capsules, in which the wet capsules as coated are in contact with one another. From FIGS. 4A and 4B, it will be seen that the effect of the downward force is to force the capsules to contact each other over progressively larger areas, so that in the final dried layer the capsules have substantially the form of polygonal prisms having a height substantially greater than their width; if the wet capsules are hexagonally close packed, as is ideally the case, the dried capsules will have substantially the form of hexagonal prisms. It should be noted that if capsules are too sparsely packed, voids may be left between the capsules as they dry and tend to associate into clusters.

FIG. 4B illustrates the capsules in an electro-optic display formed by placing the capsules between electrodes 120 and 122, a voltage supply means V being connected between the electrodes 120 and 122 for applying a voltage not greater than a predetermined value in either direction across the layer of capsules. Particles 124 bearing charges of one polarity are attracted to electrode 120 while particles 126 bearing charges of the opposite polarity are attracted to electrode 122.

C: Slurry Preparation Effects on Dried Capsule Shape

The pH level of the capsules may affect dried capsule shape. As pH is increased, the charge on gelatin changes, affecting the attraction of the gelatin to the substrate (typically an ITO surface) on which the capsules are coated and making it harder or easier for capsules to shift location. Choice of substrate surface energy by changing substrates may affect this relationship.

Surfactant level affects the adhesion ("stickiness") of capsules to each other and possibly to the binder. A more surface active surfactant weakens surface tension and should reduce the surface tension forces acting on the capsules during drying. A less surface active formulation may help flatten capsules.

Binder ratio is a critical factor affecting dry capsule shape. Lower binder ratios result in rounder capsules. A binder ratio of 2:1 (i.e., two parts by weight of capsules to one part by weight of binder) is sufficient to fully surround each capsule as a perfect sphere when dried and hence results in the least flattened capsules. Lower binder ratios allow the binder, when dry, to fill the interstices between capsules. A binder ratio of 8:1 is adequate to achieve flat capsules or heightened (polygonal) capsules depending on coating conditions.

D: Coating Parameter Effects on Dried Capsule Shape

As described above, the coating process should optimally deposit wet capsules a predetermined distance apart. Critical parameters in achieving such desired spacing include coating speed, die type, die height, and slurry flow rate.

Experimentally, it has been found that increasing the slurry flow rate in a coater, while holding all other parameters constant, tends to increase coating weight, with the result that the wet capsules are placed closer together. This could result in some capsules being too closely spaced, resulting in less flattened/more heightened dried capsules.

In related coating experiments, decreasing the gap in the die to a low value (e.g., 40-50 μm) brought the die height to a value comparable to the size of the wet capsules being used. At this die height, a monolayer of capsules was virtually assured, but the packing was usually very tight. Coatings at lower die heights tended to result in heightened dried capsules. Ideally, the capsules would be coated "almost touching together" but not packed together when wet.

E: Drying Parameter Effects on Dried Capsule Shape

Experimentally, it has been found that a conveyor oven drying at 60° C. for 2 minutes is able to create capsule-containing films with flattened, heightened and spherical dry capsules. Attempting to dry the capsules too quickly may cause a "skin" to form on the top of the binder; this skin traps moisture within the binder and causes the film to dry very slowly.

The rate of air flow while drying affects the rate of evaporation and affects whether evaporative gases are trapped among the capsules. It is difficult to achieve good success in drying without adequate ventilation; air flow across the binder is helpful.

The foregoing description has emphasized the application of the invention to electrophoretic displays. Such electrophoretic displays may be of any type and still benefit from at least some aspects of this invention. Thus, the displays may include microcavity electrophoretic displays, such as encapsulated, microcell, microcup, and polymer-dispersed displays; electrophoretic displays using one or more species of particles (except of course for those aspects of the invention specific to dual particle electrophoretic displays); electrophoretic displays using clear or dyed suspending fluids; electrophoretic displays comprising oil-based and gaseous suspending media; flexible and rigid electrophoretic displays; electrophoretic displays addressed by non-linear devices (such as thin film transistors), by passive means (such as a control grid) and by direct drive; electrophoretic displays operating by lateral or in-plane motion of the electrophoretic particles, by vertical or electrode-to-electrode motion or any combination thereof; and full-color, spot-color and monochrome electrophoretic displays.

Finally, it is again emphasized that although this invention has been principally described as applied to electrophoretic displays, many aspects thereof are applicable to any electro-optic display or medium capable of a remnant voltage, with particular importance for bistable electro-optic displays.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. An electrophoretic medium comprising a suspending fluid, a plurality of a first type of electrically-charged particles held in the suspending fluid and capable of moving therethrough on application of an electric field to the electrophoretic medium, and a plurality of a second type of electrically-charged particles held in the suspending fluid and capable of moving therethrough on application of an electric field to the electrophoretic medium, the particles of the second type having a charge of an opposite polarity to the particles of the first type, wherein the total charge on the particles of the second type is from about one-half to about twice the total charge on the particles of the first type.

2. An electrophoretic medium according to claim 1 which is an encapsulated electrophoretic medium, a polymer-dispersed electrophoretic medium or a microcell electrophoretic medium.

3. An electrophoretic medium according to claim 1 wherein the suspending fluid is gaseous.

4. An electrophoretic medium according to claim 1 which displays a remnant voltage of less than about 1 Volt one second after the application thereto of a square wave addressing pulse of 15 Volts for 300 milliseconds.

5. An electrophoretic medium according to claim 4 which displays a remnant voltage of less than about 0.2 Volt one second after the application thereto of a square wave addressing pulse of 15 Volts for 300 milliseconds.

6. An electrophoretic medium comprising a suspending fluid, a plurality of a first type of electrically-charged particles held in the suspending fluid and capable of moving therethrough on application of an electric field to the electrophoretic medium, and a plurality of a second type of electrically-charged particles held in the suspending fluid and capable of moving therethrough on application of an electric field to the electrophoretic medium, the particles of the second type having a charge of an opposite polarity to the particles of the first type, the medium displaying a remnant voltage of less than about 1 Volt one second after the application thereto of a square wave addressing pulse of 15 Volts for 300 milliseconds.

7. An electrophoretic medium according to claim 6 which displays a remnant voltage of less than about 0.2 Volt one second after the application thereto of a square wave addressing pulse of 15 Volts for 300 milliseconds.

8. An electrophoretic medium comprising a plurality of discrete droplets of a suspending fluid dispersed in a continuous phase, the droplets further comprising a plurality of electrically-charged particles held in the suspending fluid and capable of moving therethrough on application of an electric field to the electrophoretic medium, wherein the continuous phase has a volume resistivity not greater than about one-half of a volume resistivity of the droplets, and that both the continuous phase and the droplets having a volume resistivity of less than about $10^{11}$ ohm cm.

* * * * *